(12) United States Patent
Gal

(10) Patent No.: US 7,733,416 B2
(45) Date of Patent: Jun. 8, 2010

(54) COMPACT MOBILE RECONNAISSANCE SYSTEM

(75) Inventor: Ehud Gal, Reut (IL)

(73) Assignee: O.D.F. Optronics Ltd., Tel Aviv (IL)

( * ) Notice: Subject to any disclaimer, the term of this patent is extended or adjusted under 35 U.S.C. 154(b) by 1252 days.

(21) Appl. No.: 10/502,923

(22) PCT Filed: Jun. 16, 2004

(86) PCT No.: PCT/IL2004/000518

§ 371 (c)(1),
(2), (4) Date: Oct. 4, 2005

(87) PCT Pub. No.: WO2004/111673

PCT Pub. Date: Dec. 23, 2004

(65) Prior Publication Data

US 2006/0055764 A1 Mar. 16, 2006

(30) Foreign Application Priority Data

Jun. 17, 2003 (IL) .................................. 156478

(51) Int. Cl.
*H04N 5/225* (2006.01)
*H04N 7/18* (2006.01)
*H04N 5/232* (2006.01)
*H04B 1/034* (2006.01)

(52) U.S. Cl. .................. 348/373; 348/158; 348/211.99; 455/98

(58) Field of Classification Search ................ 348/151, 348/158, 211.2, 211.4, 211.99, 117, 118, 348/123; 244/3.11, 190; 455/98
See application file for complete search history.

(56) References Cited

U.S. PATENT DOCUMENTS

| | | | |
|---|---|---|---|
| 3,962,537 A * | 6/1976 | Kearns et al. ............... | 348/144 |
| 4,742,390 A | 5/1988 | Francke et al. | |
| 5,406,287 A * | 4/1995 | Pinkus ........................ | 342/13 |
| 5,467,681 A | 11/1995 | Liberman | |
| 5,808,226 A | 9/1998 | Allen et al. | |
| 6,034,722 A * | 3/2000 | Viney et al. ................. | 348/135 |
| 6,119,976 A * | 9/2000 | Rogers ........................ | 244/13 |
| 6,510,776 B2 | 1/2003 | Sirmalis et al. | |
| 6,577,339 B1 | 6/2003 | Thompson et al. | |
| 6,739,232 B2 | 5/2004 | Porter et al. | |
| 6,831,699 B2 | 12/2004 | Chang et al. | |

(Continued)

FOREIGN PATENT DOCUMENTS

EP 1 111 692 A2 6/2001

(Continued)

OTHER PUBLICATIONS

Patent Abstracts of Japan of JP 2000-278673 dated Oct. 6, 2000.

(Continued)

*Primary Examiner*—Luong T Nguyen
(74) *Attorney, Agent, or Firm*—Ladas & Parry LLP

(57) ABSTRACT

The present invention provides a compact mobile reconnaissance device that is designed to be deployed in hostile, dangerous, or difficult to access environments, to absorb shocks, to be resistant to adverse environmental conditions, and to transmit video and audio streams related to events at which it has been deployed to a remote receiver and display unit.

37 Claims, 4 Drawing Sheets

U.S. PATENT DOCUMENTS

| | | | |
|---|---|---|---|
| 6,924,838 B1 * | 8/2005 | Nieves | 348/211.99 |
| 7,463,280 B2 * | 12/2008 | Steuart, III | 348/36 |
| 2001/0017665 A1 | 8/2001 | Ackerman et al. | |
| 2005/0179812 A1 | 8/2005 | Chang et al. | |
| 2005/0206729 A1 | 9/2005 | Chang et al. | |

FOREIGN PATENT DOCUMENTS

| | | |
|---|---|---|
| JP | 07-069284 | 3/1995 |
| JP | 2000-278673 | 10/2000 |
| JP | 2001-042420 | 2/2001 |
| JP | 2002-040548 | 2/2002 |
| WO | WO 03/007258 | 1/2003 |
| WO | WO 03/046830 | 6/2003 |

OTHER PUBLICATIONS

Patent Abstracts of Japan of JP 2002-040548 dated Feb. 6, 2002.
Patent Abstracts of Japan of JP 2001-042420 dated Feb. 16, 2001.
Patent Abstracts of Japan of JP 07-069284 dated Mar. 14, 1995.

* cited by examiner

COMPACT MOBILE RECONNAISSANCE SYSTEM

FIELD OF THE INVENTION

The present invention relates to the field of imaging. More specifically, the invention provides a compact mobile reconnaissance device that is designed to be deployed in hostile, dangerous, or difficult to access environments, absorb shocks, be resistant to adverse environmental conditions, and transmit video and audio streams to a remote receiver and display unit.

BACKGROUND OF THE INVENTION

Methods of anti-terrorism combat, urban warfare and law-enforcement require operation of ground troops, Special Forces or law enforcement units in areas where exiting buildings and structures may provide shelter to hostile elements. Movement of troops must be made with caution to avoid being taken by surprise and being attacked by hostile elements. In addition, incidents of "friendly fire" may occur, where troops mistake their own forces with the enemy. Efforts are also made to avoid causing injuries to civilians or hostages that may be nearby.

Typical situations encountered in law-enforcement, anti-terrorism combat, or urban warfare include searches in buildings; movement is narrow alleys; exposure and search of bunkers, caves and tunnels; operations to expose terrorist nests and capture terrorists or wanted criminals; search and rescue of hostages; sweeps of hostile or potentially hazardous locations; taking control of hostile facilities or regaining control of captured facilities; quieting of prison riots during which prison officers may be taken hostage etc.

The above mentioned situations make it clear that anti-terrorism combat, urban warfare situations and law enforcement operations would benefit greatly from devices that could supply increased situational awareness, or real-time reconnaissance "around the corner".

Limited means for coping with the abovementioned situations can be found in the prior art. International publication WO 03046830 describes a self contained panoramic imaging device, which is based on the use of an omni-directional lens, enabling capture of the entire 360 degrees scene around it simultaneously. The use of an omni-directional lens causes the image-sensor resolution to be divided over the entire omni-directional scene. As opposed to the method of the mentioned publication, use of an image-sensor with the same resolution and a common-aperture lens, would cause the image-sensor resolution to be divided on a smaller scene, thus increasing image quality, enabling observation to farther distances. In addition, the use of an omni-directional lens provides a distorted image that needs to be processed at the display station, requiring a significant component to be added to the system in the form of software or Digital Signal Processor that would de-wrap the image and present it in a comprehensible form.

It is the purpose of the present invention to provide a sensor assembly, which is deployable to out-of-sight or potentially hazardous locations.

It is another purpose of the present invention to provide a sensor assembly having a rugged structure, which enables it to sustain shocks and vibration caused by "violent" deployment.

It is yet another purpose of the present invention to provide remote control over the sensor-assembly's functions.

It is further a purpose of the present invention to provide a control and display unit for the system.

Further purposes and advantages of the invention will appear as the description proceeds.

SUMMARY OF THE INVENTION

The present invention provides a reconnaissance device that can be placed, rolled, thrown, or fired by a suitably adapted weapon to out-of-sight or potentially dangerous environments and transmits video and audio signals from these environments to a remote display unit. The device is intended for use in anti-terrorism combat, urban warfare, search and rescue operations, law enforcement operations, and security and surveillance applications.

The system includes a rugged, ball-shaped sensor assembly equipped with a camera, a microphone, a power source, a transmitter, a receiver, an illumination assembly, and a motor. The rugged construction of the ball enables it to sustain shocks and vibrations created during its deployment. The ball's center of gravity is located such as to cause it to come to rest in an upward orientation, enabling the camera and the microphone to be positioned at an optimal angle to collect data. The transmitter transmits the video and audio signals that are collected by the ball to a remote display unit. The ball is equipped with an internal motor, which enables it to rotate 360 degrees around its axis and capture the entire scene around it. The motor's operation is remote controlled by a control unit, placed at the operator's end. The ball also includes an illumination assembly, which provides illumination, when the ball is located in poorly lit environments. The system also includes a control and display unit, which enables the operator to see the image transmitted by the ball, listen to the audio transmitted by the ball, and control the ball's functions.

The present invention provides a sensor assembly that can be deployed into potentially dangerous environments and transmit a record of the events occurring in this environment to forces located in safe positions; thus, enabling the forces to take educated decisions before and while moving into the environment.

The present invention provides both the option of observing a full 360-degree panoramic scene and the option of viewing a limited sector by controlled rotation of the sensor assembly; thus allowing optimal image-resolution to be employed on the observed sector.

The present invention typically does not require the use of special software for analyzing and displaying the signals received at the display station; thus reducing the expense of the system as well as the time and complexity of its operation. However, for advanced applications such as creating a 360 degrees panoramic image as the ball rotates and providing Video Motion Detection special software is required.

In a first aspect the present invention provides a compact mobile sensor assembly. In its basic embodiment the sensor assembly of the invention comprises:
  a. An image sensor facing towards the exterior of the sensor assembly;
  b. A transmitter, capable of transmitting the image captured by the image sensor;
  c. An energy pack providing power to the sensor assembly and its components
  d. A plate defining the bottom of the sensor assembly;
  e. A motor and related components capable of rotating the sensor assembly around its vertical axis, while the plate remains stationary;

f. A housing capable of protecting the components of the sensor assembly from shocks resulting from its deployment and preserving the integrity of the sensor assembly, thereby guaranteeing its proper functioning; and g. A center of gravity located to assist in positioning and stabilizing the sensor assembly with the plate adjacent to the ground.

The sensor assembly of the invention can be deployed by placing it in or throwing or firing it to the location at which it is desired to carry out surveillance. The housing is designed to sustain the shocks of the deployment. The shape of the housing, the shape of the plate, and the location of the center of gravity cause the sensor assembly to stabilize and orient itself with the plate adjacent to the ground. The image sensor captures the scene surrounding the image sensor.

In a preferred embodiment, the housing of the sensor assembly is spherically shaped. In some embodiments, the internal energy pack can be rechargeable in which case the sensor assembly further comprises an input socket for connecting a charger for the rechargeable internal energy pack. The input socket can also be used for connecting an alternative power source.

The transmitter can be wireless. The sensor assembly of the invention may further comprise a microphone, in which case the transmitter is capable of transmitting audio signals captured by the microphone. Preferably the microphone is positioned in the center of the upper surface of the sensor assembly.

In a preferred embodiment of the invention, the compact mobile sensor assembly further comprises an illumination assembly, capable of providing light to the scene captured by the image sensor. The image sensor is sensitive to the wave length of the light emitted by the illumination assembly. In a preferred embodiment the illumination assembly comprises Light Emitting Diodes. In different embodiments of the invention the wavelengths of the light provided by the illumination assembly can be in the visible, near infra red, or infra red spectrum. The sensor assembly can further comprise a light sensor capable of sensing the illumination level in the surroundings of the image sensor and of activating the illumination assembly when the illumination level is below a predetermined threshold value.

In a preferred embodiment of the sensor assembly of the invention the plate has a flattened area on its bottom side and can have elements in the form of small feet distributed on its bottom.

The housing of the sensor assembly is preferably fabricated by casting rubber or plastic. In another preferred embodiment the housing of the sensor assembly is fabricated by casting several layers of different materials.

The location of the center of gravity of the sensor assembly is determined by the choice of location of the inner components of the sensor assembly. In a preferred embodiment of the invention the motor of the sensor assembly is activated by a receiver which controls the motor in accordance with commands transmitted to it.

In another aspect the present invention provides a mobile reconnaissance system comprising:

a. a compact mobile sensor assembly; and
b. a control and display unit.

In a preferred embodiment the control and display unit comprises a display screen, which displays signals transmitted from the sensor assembly, and a receiver capable of receiving data sent by the transmitter of the sensor assembly. The control and display unit can further comprise a transmitter capable of transmitting commands to the sensor assembly. The transmitter can be a wireless transmitter.

In different embodiments the mobile reconnaissance system of the invention is capable of controlling operation of the motor, illumination assembly, and/or the image sensor of the sensor assembly.

In some embodiments of the mobile reconnaissance system of the invention, the control and display unit is capable of performing image processing and/or video motion detection on the image received and/or a continuous panoramic image, which is updated according to rotation of the sensor assembly, and/or optical zoom of the image sensor, which is controlled by the control and display unit.

In another embodiment of the invention the mobile reconnaissance system comprises more than one sensor assembly. Each of the sensor assemblies comprises a transmitter, which transmits at a different frequency. The transmitters can be wireless transmitters. In this embodiment the control and display unit is capable of controlling several different sensor assemblies alternately.

In another embodiment of the invention, the sensor assembly can comprise a receiver and speaker and is capable of receiving and broadcasting audio signals sent from a remote location.

DETAILED DESCRIPTION OF THE DRAWINGS

For a better understanding of the invention and to show how the same may be carried into effect, reference will now be made, purely by way of example, to the accompanying drawings. With specific reference to the drawings in detail, it is stressed that the particulars shown are by way of example and for purposes of illustrative discussion of preferred embodiments of the present invention only, and are presented for the purpose of providing what is believed to be the most useful and readily understood description of the principles and conceptual aspects of the invention. In this regard, no attempt is made to show structural details of the invention in more detail than is necessary for a fundamental understanding of the invention. From the description taken together with the drawings it will be apparent to those skilled in the art how the several forms of the invention may be embodied in practice.

Figure 1:
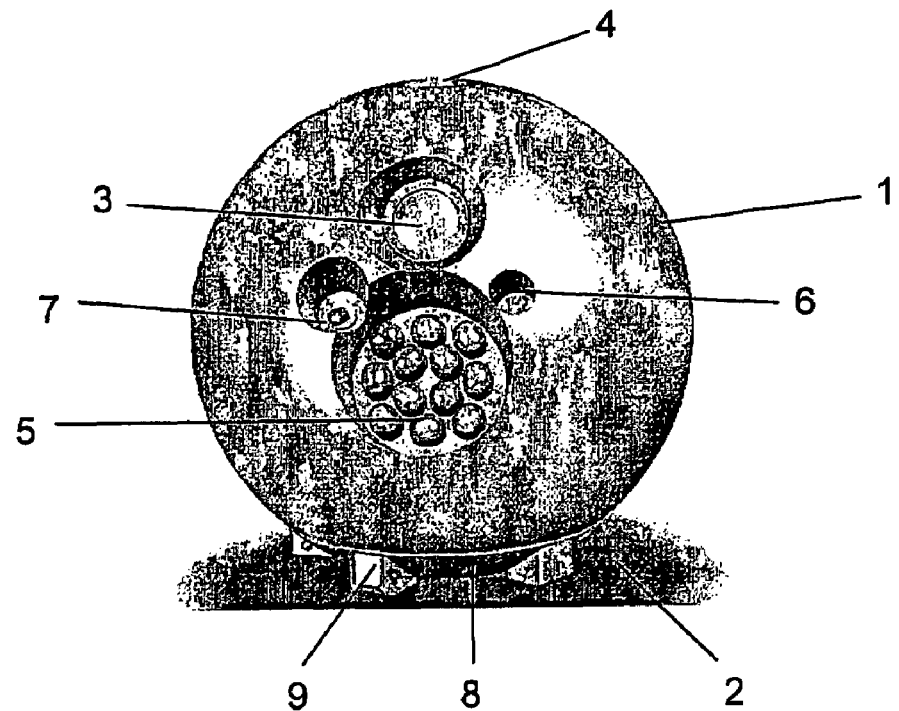
FIG. 1 is a front view of the sensor assembly of the invention;.

FIG. 1 is a front view of the sensor assembly (1). The sensor assembly (1) is fabricated in a shape of a ball, allowing it to roll freely when thrown or shot by the operator to the location at which it is desired to carry out observations. Henceforth the terms "sensor assembly", "assembly", and "ball" will be used interchangeably herein to indicate sensor assembly (1). The position of the internal components of the sensor assembly (1) determines its center of gravity, allowing the assembly (1)

to position itself independently with its bottom side (2) closest to the ground, when thrown. As a result of the round shape, the low center of gravity of the assembly (1), and additional structural elements of the bottom side (2) to be described hereinbelow, the assembly (1) rolls freely when it is thrown and eventually orients itself with its bottom side (2) closest to the ground. This allows the image sensor (3) to be positioned optimally to capture the image of a scene in front of the ball (1). The image sensor (3) is located inside the sensor assembly (1), with only its optical lens exposed to the exterior.

The sensor assembly (1) further comprises a microphone (4), positioned optimally to collect audio from the surroundings of the ball (1). The microphone (4) is positioned in the center of the top side of ball (1) in a such a manner that after the ball stabilizes on its bottom side (2), the microphone (4) will always be optimally positioned to collect audio signals from the surroundings, no matter which direction the image sensor (3) faces.

The ball (1) further comprises an illumination assembly (5) designed to emit light in the direction the image sensor (3) is pointed. The illumination assembly (5) may be comprised of a single of Light Emitting Diode (LED) or an array of LEDs. The illumination assembly (5) may alternatively include any other source of illumination, as long as the size and power consumption of the source is compatible with the other requirements of the sensor assembly (1).

The illumination assembly (5) may provide illumination in either visible or invisible wavelengths, e.g. the Near Infra Red (NIR) or Infra Red (IR). The illumination assembly (5) may be comprised of a combination of illumination sources, some providing visible and some invisible light. It is important to note, that the purpose of the illumination assembly (5) is to allow the image sensor (3) to collect effective video data, even in poorly lit, or completely dark environment, therefore the image sensor (3) needs to be sensitive to the wave length emitted by the illumination source (5).

Adjacent to the illumination assembly (5) there is positioned a light sensor (6). The light sensor (6) is designed to detect the illumination level in the environment of the ball (1). The light sensor (6) senses when the illumination level drops below a predetermined threshold level and activates the illumination assembly (5) when necessary.

The front of the ball (1) further includes an activation switch (7), which is used to activate the sensor assembly (1).

The above-mentioned components, namely the optical lens of the image sensor (3), the microphone (4), the illumination assembly (5), the light sensor (6), and the activation switch (7) are all positioned in compatible niches on the surface of sensor assembly (1) in order to avoid any damage when the ball (1) is thrown or rolled.

The entire size of the ball (1) is designed to fit in the palm of the hand of an average operator, so that it can be easily held and thrown to an area of interest. As will be elaborated in detail, most of the components of the ball are preferably placed within a cast housing which protects the components from shocks and vibrations caused as a result of deployment of the ball (1).

The bottom side (2) of the ball includes a plate (8) which is not part of the cast housing, since it is designed to enable the ball (1) to rotate 360 degrees around its vertical axis, allowing the image sensor (3) to collect video data from the scene located all around the ball (1). The plate (8) is designed in an optimal way to enable quick stabilization of the ball (1) after it is thrown. The plate (8) is preferably shaped to conform to the shape of the ball (1), with the bottom of the plate (8) flattened to allow for quick stabilization. The plate (8) may also include additional stabilizing means (9) in the form of small feet.

Figure 2:
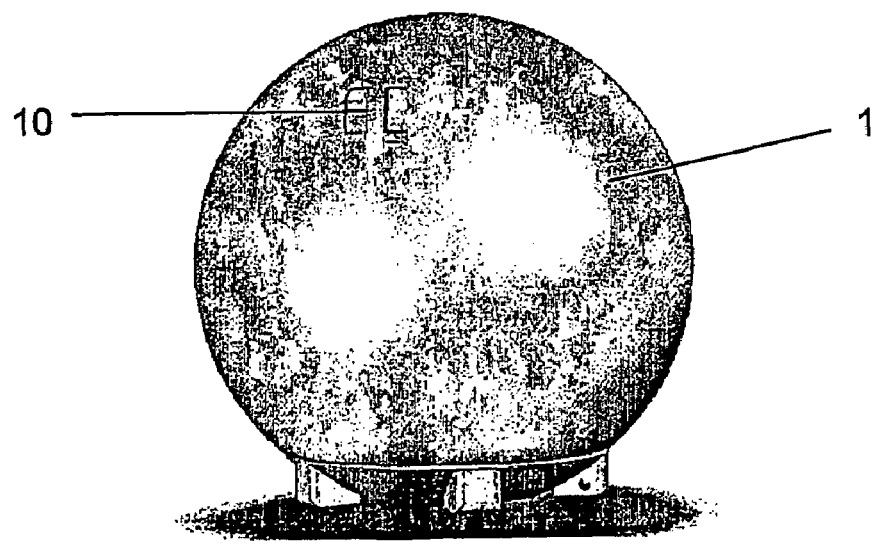
FIG. 2 shows a rear view of the sensor assembly of FIG. 1.

FIG. 2 shows a rear view of the sensor assembly (1). On the rear side of the ball (1) there is placed an input socket (10) for an alternative power source or charger for the rechargeable power source that is located inside the ball (1). The rear side may include additional sockets, such as video and audio outputs. Typically, video and audio signals are transmitted wirelessly from the ball to the receiver unit by means of a transmitter located inside the ball (1). However, some mission profiles may enable or require the use of transmission via wires and for this purpose it is possible to provide embodiments of the ball having appropriate outputs on its rear side.

Figure 3:
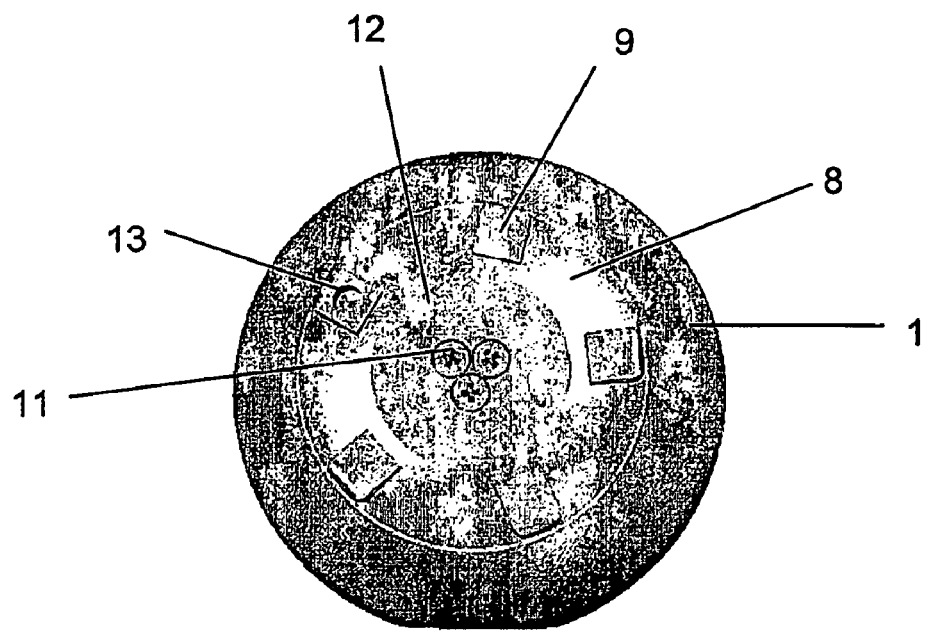
FIG. 3 shows the bottom side of the sensor assembly of FIG. 1.

FIG. 3 shows the bottom side of the sensor assembly (1). In the bottom side there is placed a plate (8), which serves as a base for rotation of the ball (1). The plate (8) is connected by means of screws (11) to a motor located inside the ball (1). Upon activation of the ball's rotation mechanism, as will be described hereinbelow, plate (8) remains stationary and the ball (1) rotates around its axis. As mentioned hereinabove, the plate's shape conforms to the round shape of the ball (1), however, to allow for quick and effective stabilization of the ball (1) after it is thrown, it is preferable that the plate (8) will include a flattened area (12) on which the ball (1) will stabilize. It is further preferable to include additional elements on the plate (8) in the form of small feet (9) which will allow for a quicker and more effective stabilization.

The plate may include a threaded bore (13) (shown in FIG. 3 in one of the feet (6)) for connection of the ball (1) to exterior equipment such as a tripod. The plate (8) may further include attachment means (not shown in the figures) for connection of a cable or rope that would enable control of the descent of the ball into tunnels, or retrieval of the ball after it has been thrown.

Figure 4:
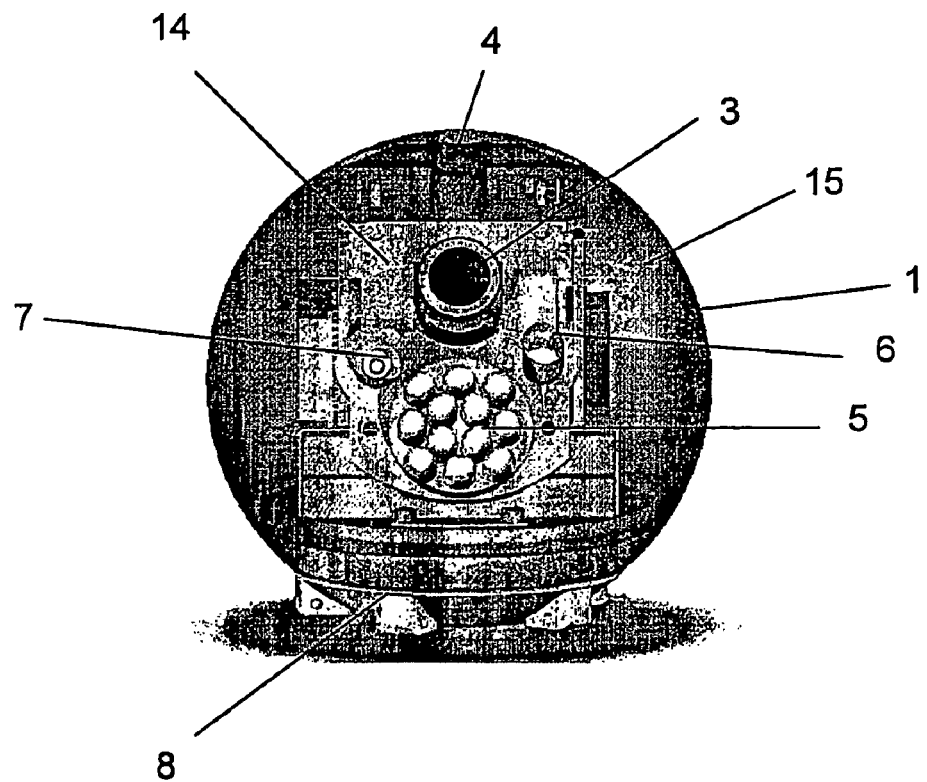
FIG. 4 shows the location inside the robust cast housing of the components of the sensor assembly of FIG. 1.

FIG. 4 shows the location of the components inside the robust housing of ball (1). The housing should be capable of protecting the components of the sensor assembly from shocks resulting from its deployment and preserving the integrity of the sensor assembly, thereby guaranteeing its proper functioning. A preferable method of fabrication of the ball (1) is to fasten all its inner components (14) to a structural frame and then to place a mold over the frame and cast the housing by pouring the material (15) of the ball, typically molten rubber or plastic, over, around, and between the components (14) and then allowing the material to harden before removing the mold. In this manner, all spaces between the components are filled with the casting material and all the inner components (14) are fastened in their place and protected from potential damage that may occur as a result of deployment of the ball. During this fabrication process, shields must be used to prevent the casting material from leaking into the interiors of components (14) and/or covering undesired places, e.g. the front surfaces of the image sensor (3), the microphone (4), the illumination assembly (5), the light sensor (6) and the activation switch (7). The plate (8) is connected to the ball (1) after the casting is complete.

It should be noted that in the case of applications where "violent" deployment of ball (1) is not required, it is possible to fabricate the housing using conventional materials and methods, without the necessity of providing the ball with special rugged qualities.

Figure 5:
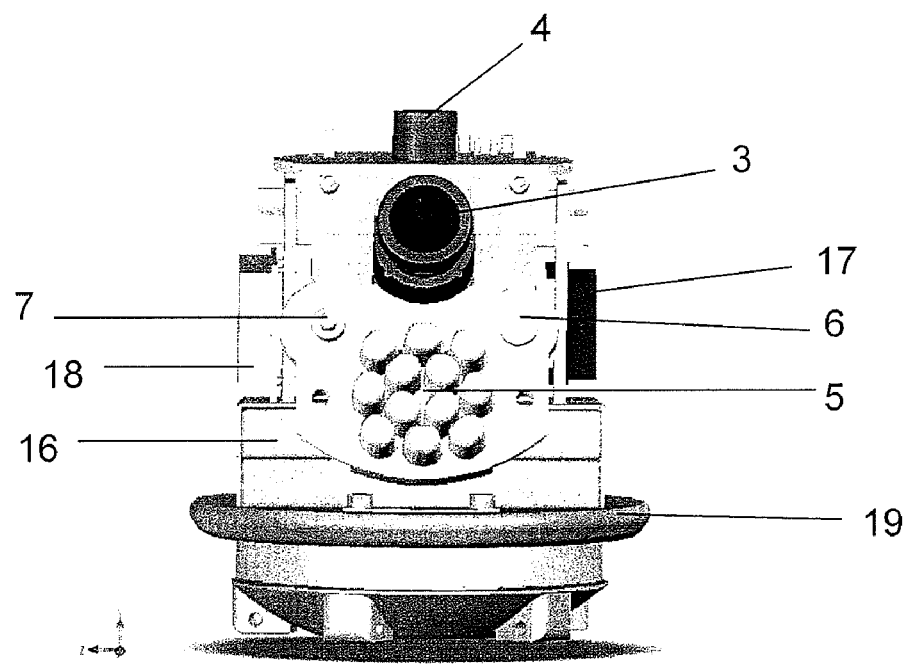
FIG. 5 is a front view of the sensor assembly of FIG. 1 with part of the casing removed to reveal the inner components of the ball.

FIG. 5 is a front view of sensor assembly (1) with part of the casing removed to reveal the inner components of the ball. The components shown include the image sensor (3), the microphone (4), the illumination assembly (5), the light sensor (6), the activation switch (7), energy pack (16), transmitter (17), receiver (18) and the base (19) of the structural frame. As described hereinabove, all of the inner components of the sensor assembly (1) are fastened to a mechanical structure base (19) located at the bottom of the assembly. The optical lens of image sensor (3), the illumination assembly (5), and the light sensor (6) are oriented facing towards the exterior of the ball. The microphone (4) is placed in the center of the upper side of the sensor assembly, to enable it to capture audio from all around the ball. The energy pack (16) provides power for all elements of the sensor assembly, and it is preferably rechargeable. A transmitter (17) is connected to image capture device (3) and microphone (4) and wirelessly transmits audio and video signals from the sensor assembly (1) to the remotely located operator. A receiver (18) receives commands from the remote control unit, which is located with the operator. Control commands will be elaborated in reference to FIG. 7, describing the control unit hereinbelow.

Figure 6:
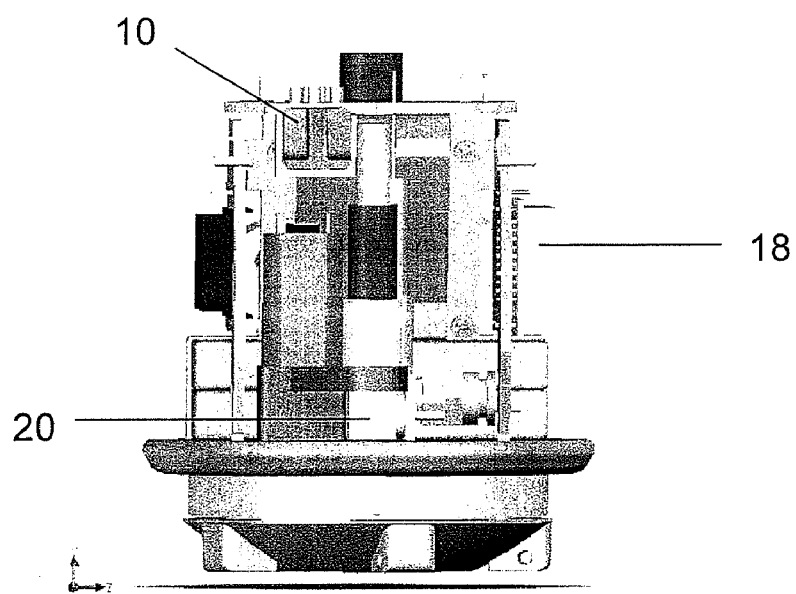
FIG. 6 is a back view of the sensor assembly of FIG. 1 with part of the casing removed to reveal the inner components of the ball.

FIG. 6 is a back view of sensor assembly (1) with part of the casing removed to reveal the inner components of the ball. The components shown in FIG. 6 include power input socket (10) and a motor and related components (20), which are used to cause and control rotation of the sensor assembly. When the ball is thrown, the operator has no way of determining the position in which the ball will eventually come to rest. While the ball will stabilize itself with its bottom side (2) on the surface on which the ball comes to rest, there is no way of predicting the direction the image sensor will face. In order to point the image sensor in a desired direction, the ability to rotate the ball from a remote location must be provided to sensor assembly (1). The motor and related components (20) receive rotation commands from the remote control unit by means of receiver (18). The motor can be instructed to rotate the ball continuously, stop the rotation, and reverse the rotation direction.

In FIG. 5 and FIG. 6 are shown only the main components of the sensor assembly in order to describe its main features. It should be clear to those skilled in the art that additional components not mentioned are also included in the sensor assembly, those include electronic components, printed circuits, wires, gears, parts of the structural frame, screws etc. It should also be clear to skilled persons that there can be many alternative ways of arranging the different components inside the sensor assembly. The component layout described herein is of a preferred implementation of the present invention, which takes into consideration the sensor assembly's intended features and performance.

The specific method of implementation described herein is not intended, and should not be used, to limit the scope of the present invention in any way.

Figure 7:
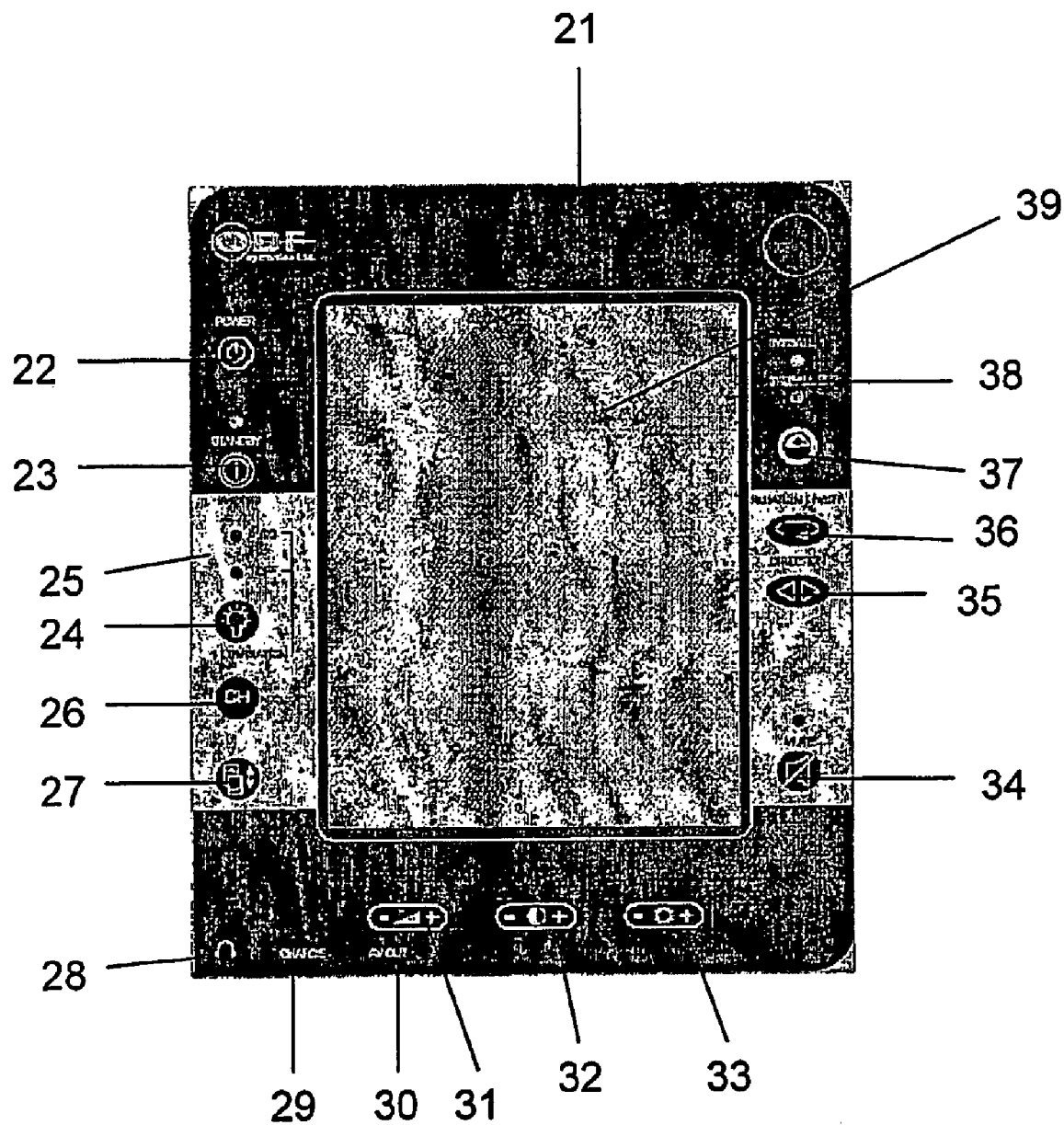
FIG. 7 shows the remote control and display unit associated with the sensor assembly of the invention.

FIG. 7 shows the remote control and display unit, which is part of the system. The control and display unit (21) has three basic functions: control of the sensor assembly's operation, presentation of the image received from the sensor assembly, and providing audio feed received from the sensor assembly. The control and display unit (21) includes a number of buttons, input and output sockets as will be described. A "power" button (22) is used to turn on and off the control and display unit (21). A "Stand By" button (23) is used to enter the sensor assembly to stand-by mode after it is activated. The purpose of the "Stand By" button is to save energy when operation of the sensor assembly is not required. The "Stand By" button (23) also takes the sensor assembly out of stand by mode. An "Illumination" button (24) enables activation of the illumination assembly (5), which is on the sensor assembly. If the sensor assembly is placed or thrown into a poorly lit or completely dark environment, it is possible to remotely activate the illumination. The "Illumination" button (24) is also designed as a backup for cases when there is a malfunction in the light sensor of the sensor assembly, or when the threshold of the light sensor is set too high, causing the illumination to remain off even in poor light conditions. Illumination indicators (25) indicate whether the illumination assembly (5) on the sensor assembly is off or on. A "Channel" button (26) enables switching between transmission frequencies in order to receive clearer transmission in case of interference. A "Flip View" button (27) enables flipping the view of the image received from the sensor assembly from vertical to horizontal or other way around. An earphone socket (28) enables connection of earphones to the unit (21) for listening to the audio feed transmitted from the ball. A power socket (29) enables connection of a charger to the unit (21). An "AV Out" socket (30) enables connection of the unit (21) to external display and recording equipment.

A volume button (31) enables control over volume. A contrast button (32) enables control of image contrast. A brightness button (33) enables control of image brightness. A "Mute" button (34) controls audio mute. A "Motor Control" button (35) controls the direction of rotation of the sensor assembly. A motor activation button (36) activates and deactivates the motor of the sensor assembly. A "Sensor Selection" button (37) enables the operator to change between several sensor assemblies that are operating independently in the same arena and to control and display the signals from several sensor assemblies alternately. Sensor indicators (38) indicate which of the sensor assemblies is currently being controlled by the unit (21). An image display screen (39) presents the video image transmitted from the sensor assembly. The control and display unit (21) further comprises antennas (not shown) for receipt of visual and audio signals from the ball, as well as for transmission of control commands to the ball.

It should be clear to those skilled in the art that there are many alternative ways of arranging the different switches and input sockets on the unit (21). There may also be additional switches incorporated in the unit (21) to provide for additional features. The basic features described herein and the layout of the switches and interfaces of the unit (21) shown in FIG. 7 describe a preferred embodiment of the present invention and are not intended, and should not be used, to limit the scope of the present invention.

The use of the sensor assembly as described herein does not require processing of the image. However, there may be cases where image processing can advantageously be performed on the image. For example, when the ball is rotated, there is a possibility of transmitting the image to a processing station, where a panoramic image can be generated as the ball rotates. The image is refreshed each time the ball covers a previously presented sector. Such processing enables constant and continuous presentation of the sectors previously covered by the ball and those currently viewed by the ball. This enables also video motion detection to be performed on the image and the detection of changes in the scene. Naturally, there are cases when the rotation mechanism of the ball is not activated and the ball is used as a stationary sensor, covering a specific region of interest. In such cases it is also possible to implement image processing to detect motion in the region viewed by the ball. In any of the above-mentioned situations that image processing is either desirable or necessary, a processing station is considered to be a part of the control and display unit (21).

Herein the term "processing station" refers to any type of processing means including, but not limited to, a PC, a laptop, or a Digital Signal Processor or other processing means incorporated into the control and display unit (21). It should be clear to those skilled in the art that by proper use of electronic interfaces, it is also possible to control the sensor assembly from a computer as well as to present the image received from the sensor assembly on the computer, which would replace the specially designed control and display unit (21). It is noted that the design of electronic interfaces enabling transmission of commands from a computer to enable control of the operation of the sensor assembly is within the scope of knowledge of those skilled in the art.

The invention claimed is:

1. A compact mobile sensor assembly comprising:
   a. an image sensor facing towards the exterior of said compact mobile sensor assembly;
   b. a transmitter, capable of transmitting an image captured by said image sensor;
   c. an energy pack providing power to said compact mobile sensor assembly and its components;
   d. a plate defining the bottom of said compact mobile sensor assembly;
   e. a motor and related components capable of rotating said compact mobile sensor assembly around its vertical axis;
   f. a housing surrounding said image sensor, said transmitter, said energy pack, and said motor and related components and capable of protecting said components of said compact mobile sensor assembly from shocks resulting from its deployment and preserving the integrity of said compact mobile sensor assembly, thereby guaranteeing its proper functioning; and
   g. a center of gravity located to assist in positioning and stabilizing said compact mobile sensor assembly with said plate adjacent to the ground, wherein said compact mobile sensor assembly can be deployed by placing it in or throwing or firing it to a location at which it is desired to carry out surveillance; said housing sustains the shocks of the deployment; the shape of said housing, the shape of said plate, and the location of said center of gravity cause said compact mobile sensor assembly to stabilize and orient itself with said plate adjacent to the ground; and said image sensor captures a scene surrounding said image sensor;

and wherein, after said compact mobile sensor assembly is deployed and said motor is activated, said plate remains stationary and said housing and the components therein are rotated around the vertical axis.

2. A compact mobile sensor assembly according to claim 1, wherein said housing of said compact mobile sensor assembly is spherically shaped.

3. A compact mobile sensor assembly according to claim 1, wherein said energy pack is rechargeable.

4. A compact mobile sensor assembly according to claim 1, further comprising an input socket for connecting at least one of an alternative power source and a charger for a rechargeable internal energy pack.

5. A compact mobile sensor assembly according to claim 1, wherein said transmitter is wireless.

6. A compact mobile sensor assembly according to claim 1, further comprising a microphone wherein said transmitter is capable of transmitting audio signals captured by said microphone.

7. A compact mobile sensor assembly according to claim 6, wherein said microphone is positioned in the center of the upper surface of said compact mobile sensor assembly.

8. A compact mobile sensor assembly according to claim 1, further comprising an illumination assembly, capable of providing light to the scene captured by said image sensor.

9. A compact mobile sensor assembly according to claim 8, wherein said image sensor is sensitive to the wave length of the light emitted by said illumination assembly.

10. A compact mobile sensor assembly according to claim 8, wherein said illumination assembly comprises Light Emitting Diodes.

11. A compact mobile sensor assembly according to claim 8, wherein the wavelengths of the light provided by said illumination assembly are in the visible spectrum.

12. A compact mobile sensor assembly according to claim 8, wherein the wavelengths of the light provided by said illumination assembly are in the Near Infra Red spectrum.

13. A compact mobile sensor assembly according to claim 8, wherein the wavelengths of the light provided by said illumination assembly are in the Infra Red spectrum.

14. A compact mobile sensor assembly according to claim 1, wherein said compact mobile sensor assembly further comprises a light sensor capable of sensing illumination level in the surroundings of said image sensor and of activating the illumination assembly when said illumination level is below a predetermined threshold value.

15. A compact mobile sensor assembly according to claim 1, wherein said plate has a flattened area on its bottom side.

16. A compact mobile sensor assembly according to claim 1, wherein said plate further comprises elements in the form of small feet distributed on the bottom of said plate.

17. A compact mobile sensor assembly according to claim 1, wherein said housing of said compact mobile sensor assembly is fabricated by casting rubber.

18. A compact mobile sensor assembly according to claim 1, wherein said housing of said compact mobile sensor assembly is fabricated by casting plastic.

19. A compact mobile sensor assembly according to claim 1, wherein said housing of said compact mobile sensor assembly is fabricated by casting more than one type of material.

20. A compact mobile sensor assembly according to claim 1, wherein the location of the center of gravity of said compact mobile sensor assembly is determined by the choice of location of the inner components of said compact mobile sensor assembly.

21. A compact mobile sensor assembly according to claim 1, wherein said motor of said compact mobile sensor assembly is activated by a receiver which controls said motor in accordance with commands transmitted to it.

22. A mobile reconnaissance system comprising:
   a. a compact mobile sensor assembly according to claim 1; and
   b. a control and display unit.

23. A mobile reconnaissance system according to claim 22, wherein said control and display unit comprises:
   a. a display screen; and
   b. a receiver capable of receiving data sent by said transmitter of said compact mobile sensor assembly,
   wherein said control and display unit receives and displays signals transmitted from said compact mobile sensor assembly.

24. A mobile reconnaissance system according to claim 22, wherein said control and display unit comprises a second transmitter capable of transmitting commands to said compact mobile sensor assembly.

25. A mobile reconnaissance system according to claim 24, wherein said second transmitter is a wireless transmitter.

26. A mobile reconnaissance system according to claim 22, wherein said control and display unit is capable of controlling operation of said motor of said compact mobile sensor assembly.

27. A mobile reconnaissance system according to claim 22, wherein said control and display unit is capable of controlling operation of the illumination assembly of said compact mobile sensor assembly.

28. A mobile reconnaissance system according to claim 22, wherein said control and display unit is capable of controlling operation of said image sensor of said compact mobile sensor assembly.

29. A mobile reconnaissance system according to claim 22, wherein said control and display unit is capable of performing image processing.

30. A mobile reconnaissance system according to claim 22, wherein said control and display unit is capable of performing video motion detection on the image received.

31. A mobile reconnaissance system according to claim 22, wherein said control and display unit is capable of forming a continuous panoramic image and updating the image according to rotation of said compact mobile sensor assembly.

32. A mobile reconnaissance system according to claim 22, wherein an optical lens of said image sensor is adapted to control an optical zoom.

33. A mobile reconnaissance system according to claim 32, wherein said control and display unit is adapted to control said optical zoom of said optical lens of said image sensor.

34. A mobile reconnaissance system according to claim 22, comprising more than one sensor assembly, wherein each of said sensor assemblies comprises a transmitter and each of said transmitters transmits at a different frequency.

35. A mobile reconnaissance system according to claim 34, wherein said transmitters are wireless transmitters.

36. A mobile reconnaissance system according to claim 34, wherein said control and display unit is capable of controlling several different sensor assemblies alternately.

37. A mobile reconnaissance system according to claim 22, wherein said compact mobile sensor assembly further comprises a receiver and speaker and is capable of receiving and broadcasting audio signals sent from a remote location.

\* \* \* \* \*